United States Patent
Allawas

[19]

[11] Patent Number: 6,092,488
[45] Date of Patent: Jul. 25, 2000

[54] COLLAPSIBLE LIGHTWEIGHT ANIMAL SECURITY SHIPPING KENNEL

[76] Inventor: George Allawas, 513 N. 12th St. #B, Las Vegas, Nev. 89101

[21] Appl. No.: 09/244,476

[22] Filed: Feb. 4, 1999

[51] Int. Cl.[7] ..................................................... A01K 1/02
[52] U.S. Cl. ............................ 119/497; 119/474; 119/498
[58] Field of Search ..................... 119/474, 482, 119/497, 498, 499, 513

[56] References Cited

U.S. PATENT DOCUMENTS

| | | | |
|---|---|---|---|
| 1,192,415 | 7/1916 | Giseke | 119/499 |
| 3,890,932 | 6/1975 | Sanzone et al. | |
| 4,484,540 | 11/1984 | Yamamoto | 119/497 |
| 4,590,885 | 5/1986 | Sugiura | |
| 5,016,570 | 5/1991 | Henson | |
| 5,452,681 | 9/1995 | Ho | |
| 5,522,344 | 6/1996 | Demurjian | 119/474 |
| 5,549,073 | 8/1996 | Askins et al. | 119/474 |
| 5,669,331 | 9/1997 | Richmond | 119/497 |
| 5,778,594 | 7/1998 | Askins et al. | 119/474 |
| 5,791,292 | 8/1998 | Jempolsky | 119/482 |
| 5,803,018 | 9/1998 | Liou | 119/474 |

*Primary Examiner*—Peter M. Poon
*Assistant Examiner*—Elizabeth Shaw
*Attorney, Agent, or Firm*—Patent & Trademark Services; Thomas Zack; Joseph H. McGlynn

[57] ABSTRACT

A collapsible lightweight animal security shipping kennel having opposite side hinged walls. The walls can collapse inwardly toward each other, and when fully erect are supported by end walls inserted into slots in the top surface. Two separate sets of two tracks near opposite ends of the side walls each slideably receive one of the two opposite end walls through slots in the top surface. Handles built-into the top and bottom surfaces permit either the erected kennel or the collapsed kennel to be transported. When in a collapsed position, the end walls may be stored within the confines of the top and bottom surfaces, along with the collapsed side walls. Fasteners such as strap and pin or hook and loop may be used to latch the collapsed structure in a closed position for transport.

5 Claims, 2 Drawing Sheets

COLLAPSIBLE LIGHTWEIGHT ANIMAL SECURITY SHIPPING KENNEL

BACKGROUND OF THE INVENTION

This invention relates to general to animal kennels and, in particular to a kennel that is collapsible for transport and storage.

A recent experience while waiting at an airport ticket line initiated the mental process resulting in this invention. At that time I observed passengers and ticket agents trying to screw together and assemble a portable animal traveling kennel. The process to do so was so time consuming that it almost resulted in me missing my flight.

Ideally the portable animal traveling kennel should be: compact, lightweight and collapsible, easy to assemble and disassemble, secure and provide adequate ventilation for the enclosed and transportable animal. The present invention meets all of these goals and relates to a collapsible lightweight animal security shipping kennel (CLASSK) as will be described in detail hereafter.

DESCRIPTION OF THE PRIOR ART

Devices that are used to transport animals are known. For example, U.S. Pat. No. 3,890,932 to Sanzone et al. discloses a collapsible container with a pair of latching members pivotally coupled to the front and rear edges of the side wall members.

U.S. Pat. No. 4,590,885 to Sugiura discloses a collapsible animal cage with two pairs of pivotal projections with side plates mounted on the projections and grooves in the side plates to detachably mount the bottom plate.

U.S. Pat. No. 5,016,570 to Henson discloses a collapsible carrying container having opposite side walled hinged to the top and bottom walls. The opposite end walls are hingedly connected to the bottom wall and have flanges.

U.S. Pat. No. 5,452,681 to Ho discloses a collapsible animal house assembly is described with a base, four posts and four side walls secured together. The base and a cap or top wall have a peripheral groove to mount side walls while four nuts hold the posts to the base and cap.

SUMMARY OF THE INVENTION

This invention relates to a collapsible, lightweight animal security and shipping kennel having opposite collapsible side hinged walls. Two separate sets of tracks in these side walls each slidably receive one of the two opposite end walls through slots in the top surface. Handles built-into the top surface and the bottom surface permit either the assembled or collapsed kennel to be transported.

It is the primary object of the present invention to provide for an improved collapsible, lightweight animal security and shipping kennel.

Another object is to provide for such a kennel wherein the two opposite end walls are removably and slidably received in tracks in the side walls when the walls are erected.

These and other objects and advantages of the present invention will become apparent to readers from a consideration of the ensuing description and the accompanying drawings.

DESCRIPTION OF THE PREFERRED EMBODIMENT

Figure 1:
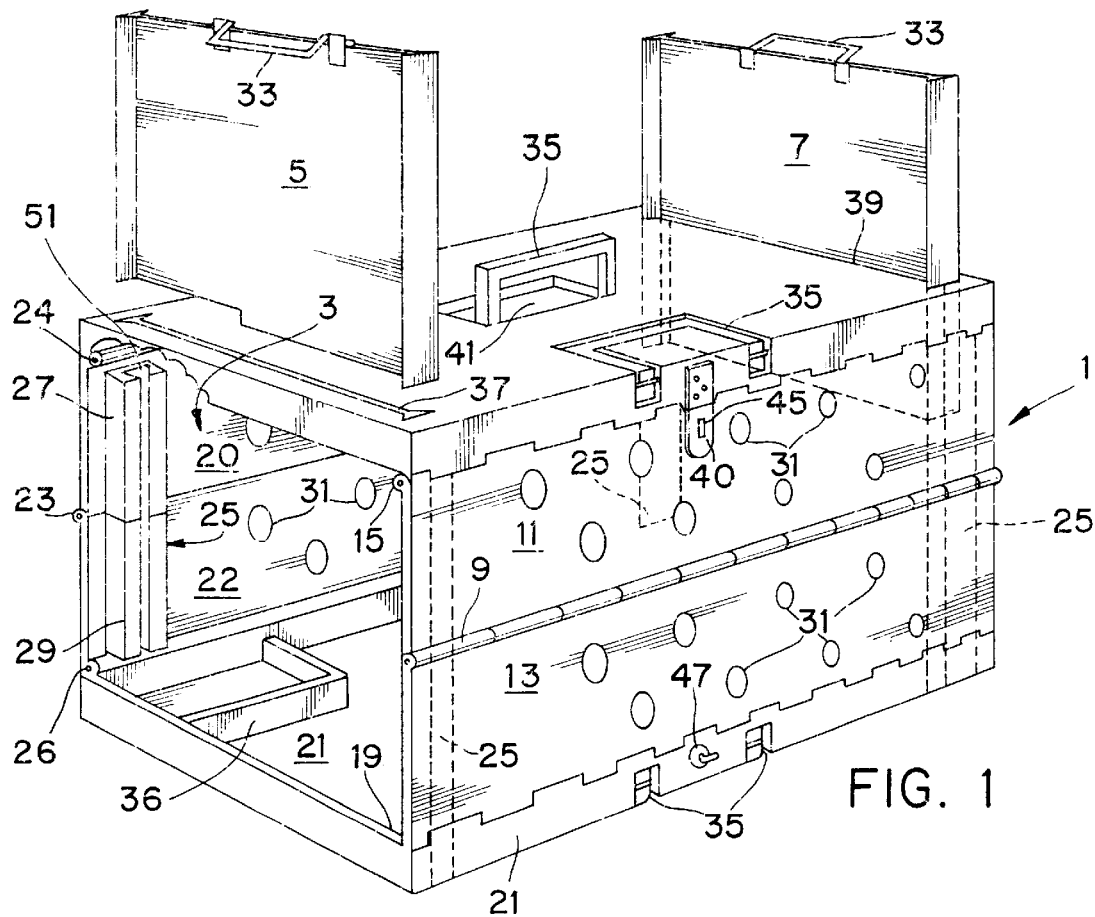
FIG. 1 is a perspective view of the present invention.

FIG. 1 is a perspective view of the present invention when the two opposite side walls 1 and 3 are in an erected position. As shown it has two insertable vertically disposed end walls 5 and 7 which are slidably received in four separate tracks 25 in the two side walls 1 and 3. Both of the side walls are substantially identical in construction and size, as are the two end walls.

As best shown in FIG. 1, the front wall 1 has a piano type hinge 9 which extends horizontally across the length of the wall and joins two engaged plate like segments 11 and 13 together. The upper edge of the side wall segment 11 is connected by a concealed hinge 15 to the top planar surface 17. A small portion of the vertical side flange for the top surface 17 has been cut away to more clearly shown the vertical track 25 behind it. The bottom edge of the side wall segment 13 is similarly connected by a concealed hinge 19 to the bottom horizontally disposed planar surface 21.

In like manner, the rear side wall 3 is divided into two plate segments 20 and 22 connected by an elongated hinge 23. The plates have upper and lower hinged connections 24 and 26 to both the top surface 17 and the bottom surface 21. This arrangement of hinges permits the two side walls 1 and 3 to be folded inwardly about their center hinges 9 and 23, respectively, and also allows the side walls to be folded towards each other and collapsed.

Extending vertically along the four internal corners of the side walls 1 and 3 are two sets of two tracks. One of these four corner tracks 25 is shown in FIG. 1. Each internal corner track is split into two equal length segments that are fixedly attached to the two internal segments of the side walls. The tracks meet at the same vertical position as do the two side wall segments. For example, the upper track segment 27 is fixed to the internal surface of the upper wall segment for rear side wall 3 and the lower track segment 29 is fixed to the lower wall segment of the side wall 3. In this way when the two segments of the two side walls are folded inwardly towards each other, the two tracks segments (27/29) for each of the four tracks fold with their wall segments and, when the walls are fully collapsed, are positioned horizontally over each other.

Both the front 1 and rear 3 side walls have a series of spaced vent holes 31, to permit the free flow of air into and out of the box-like enclosure formed by the two d vertical side walls 1 and 3. The end walls 5 and 7, when fully lowered into their supporting four tracks, the top horizontal surface 17 and the bottom horizontal surface 21 form the erecetcd structure. Also depicted in FIG. 1 are the two upper wall handles 33, fixed to the two end walls 5 and 7, and the three built-in carry handles 35. Two of the three handles 35 are located in indentations 36 formed into the top surface 17. The third handle 35 in the bottom surface 21 only has its hinged ends partially shown for clarity. The handle 35 in the center of top surface 17 when elevated is used to carry the kennel and its contents. Formed within the confines of the enclosure's bottom surface 21 are partitioned members 41 which act to provide spaces used for containers to hold water or food for the confined animals when being transported.

Two slots 37 and 39 extend through surface 21 on its two opposite end sides. These two slots are shaped and sized to receive the lower edges of the end walls 5 and 7. This permits the end walls to be slidably received in the their respective two sets of side wall tracks 25. Thus, each end wall has two ends that are received in two tracks by pushing downwardly on the end wall handles 33.

As shown in FIG. 1, the left end wall 5 is totally out of its receiving slot 37 and track 25 while the right end wall 7 is partially inserted into the slot 39 to support the tracks 25.

Figure 2:
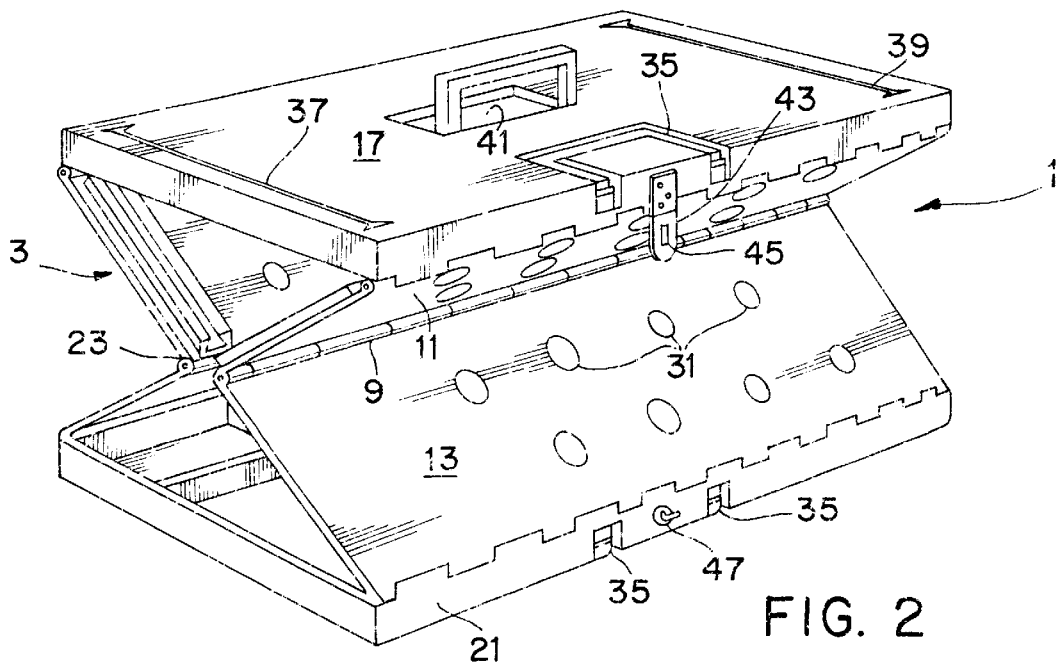
FIG. 2 is a partial perspective view of the present invention, without the end walls, showing the kennel partially collapsible.

FIG. 2 is a perspective view of the invention with the two end walls Sand 7 removed, and the front and rear side walls 1 and 3 partially collapsible. Before doing so the two end walls may be stored within the confines of the bottom surface 21 (see FIG. 5). Normally, the end walls 5 and 7 would first be pulled totally out of their tracks and slots by pulling up on the handles 33 and then putting downward pressure on surface 17 to collapse the side walls 1 and 3. Each of the three carrying handles 35 is U-shaped and is pivotally joined at two leg ends to the supporting top 17 or bottom structure 21.

Three indentations 41 complementing the shape and size of the handles 35, permit the pivotally mounted handles to be folded flat within their respective supporting surfaces. Attached upper strap latch member 43 about midway between the pivotally mounted ends of the handle 35 that is on the top's front corner edge, has a through hole 45 fitted to engage the turnable pin 47 located on the bottom 21 midway between the ends of the bottom's handle 35. The engagement of the fastener 43 with the member 47 is possible when the two sides 1 and 3 are fully collapsed.

Figure 3:
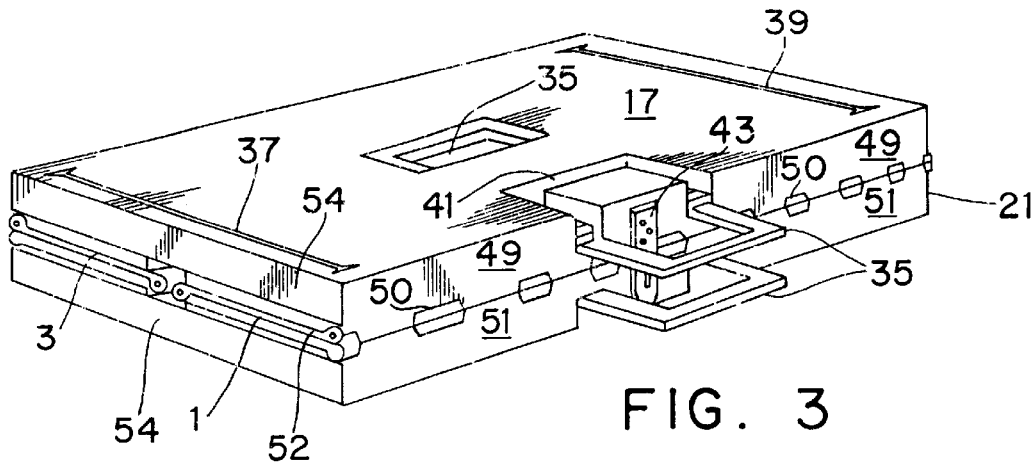
FIG. 3 is a perspective view of the present invention when fully collapsible.

FIG. 3 is a perspective view of the present invention when fully collapsible. The vertical edges 49 and 51 of the top surface 17 and bottom surface 21, respectively, having tooth like edges 50 that mesh with each other to form a continuous barrier. The side edges 52 of collapsed side walls 1 and 3 are just visible in this view as most of the side walls are totally within the confines of the enclosure formed by the top surface 17, bottom surface 21 and front 49 and 51, rear (not shown) and side edges 54. In addition, as shown in FIG. 3, when the side walls 1 and 3 are completely collapsed, the two front carrying handles 35 are pivoted from their retaining indentations 41 to their extended positions. This aligns them parallel to each other while the top handle 35 is collapsed into its indentation 41.

The fastening strap's hole 45 is aligned with the turnable lower pin element 47. The pin element 47 can be inserted into hole 45 and turned to a locking position. This permits a user to grasp the front handles 35 and transport the kennel.

Figure 4:
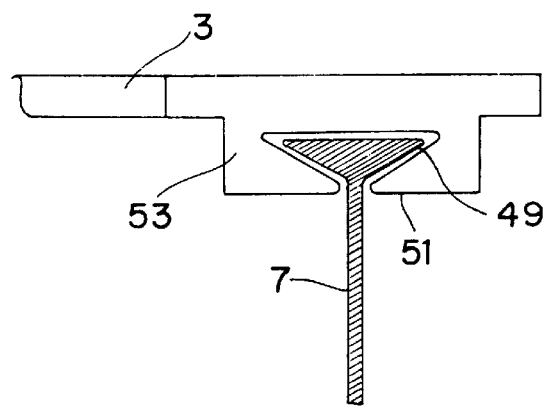
FIG. 4 is an enlarged cross sectional top view taken along lines A—A of FIG. 1 looking downwardly in the direction of the arrow, showing the engagement of the rear end wall with the track in the rear side wall.

FIG. 4 is an enlarged cross sectional top view taken along lines A—A of FIG. 1 looking in the direction of the arrow. This shows the engagement of the rear wall 7 with one of the two retaining tracks 25 on the side wall 3. The enlarged opposite ends 49 of the planar wall 7 fit within complementarily shaped slot 51 in the vertically disposed rear corner track 53. When the end wall 7 is slid downward into the slot 51 it will span the joining edge of the two side wall segments 20 and 22. This prevents the side walls 20 and 22 from collapsing on their hinged joint 23.

In a similar manner, the front part of wall member 7 also prevents the two segments 11 and 13 from collapsing when wall 7 slides down into the front right corner slotted track 25 shown in dotted lines in FIG. 1. Thus, the two end walls 5 and 7 act as support members that rigidly maintain the entire box-like structure in place in an erect position when fully inserted into their respective side tracks 25. Each of the four tracks is positioned internally of the side walls 1 and 3, with two tracks on each wall at opposite ends and vertically disposed when erected. Each slotted track engages one of the four edges of the side walls 1 or 3, as in FIG. 4

Figure 5:
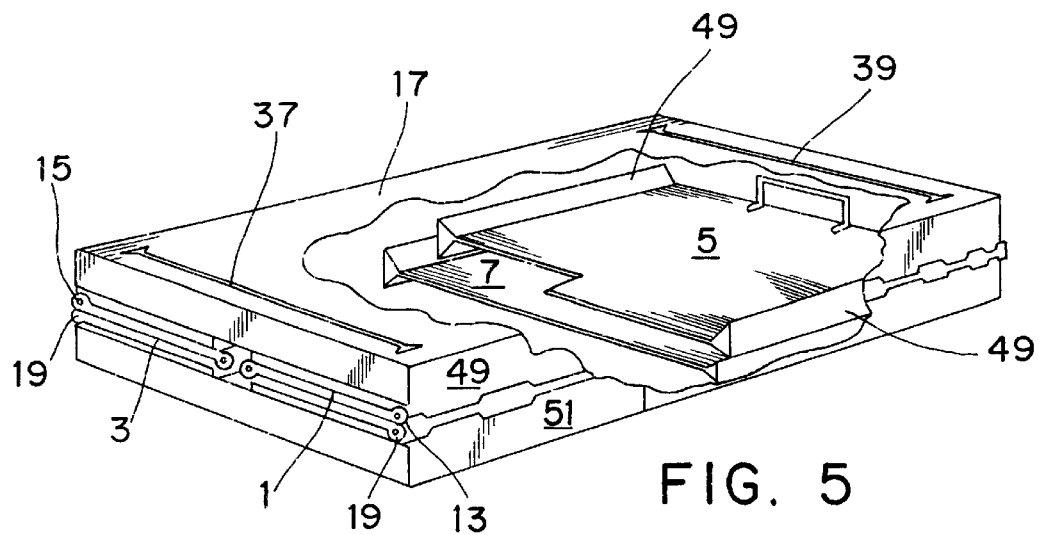
FIG. 5 is a perspective view similar to FIG. 3 with portions of the top cover and mating front edges of the top and bottoms cut away to reveal the internally stored end walls.

FIG. 5 is a perspective view similar to FIG. 3, with portions of the top cover and mating front edges of the top and bottoms cut away to reveal the disconnected and internally stored end walls 5 and 7. These end walls were simply lifted from their tracks 25 by their handles 33 and inserted within the interior of the two erected side walls 1 and 3 before they are collapsed towards each other. In the fully collapsed positions, shown in FIGS. 3 and 5, the kennel may easily be transported by grasping the two side handles 35 similar to an attache case. When in a fully erected position, as shown in FIG. 1, the assembled kennel may be transported by lifting up on the top surface 17 handle 35 to move the kennel.

To keep the weight of the container down and yet strong, most if not all of the described components can be made of plastic by the injection molding process including the sides 1 and 3, the end walls 5 and 7, the top surface 17 and the bottom surface 21.

Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the walls or sub components). High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed.

Injection molding can be a highly automated process and is capable of producing extremely detailed parts at a very cost effective price. The process should be invaluable in producing this invention's kennel cost effectively.

Additionally, a VELCRO or hook and loop type strap can be used in place of strap 43 with a mating surface used in place of the turnable pin 47 to keep the collapsed container closed.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A collapsible animal security shipping kennel comprising:

two opposite side walls, each of said side walls having two pivotally joined segments, said walls being movable from a vertically erect position to a lower horizontally fully collapsed position;

a top surface pivotally connected to said two side walls adjacent two opposite edges of the top surface;

a bottom surface pivotally connected to said two side walls adjacent two opposite edges of the bottom surface;

said top surface having opposite ends with a through surface slot located adjacent each of the opposite ends of the top surface;

each of said two opposite side walls having two vertically disposable tracks located on opposite sides of said side walls, one of said tracks being alignable with each of said slots in the top surface when said side walls are in an erected position;

each of said tracks having vertically orientable slots adapted to engage edges of an inserted end support wall; and a first end support wall and a second end support wall, each of said first and second end support walls being located on opposite sides of said top surface and slidably receivable into the slots in the top surface when said side walls are not in their fully collapsed position, whereby said inserted end support walls be adapted to vertically support the two side walls in an erected position.

2. The shipping kennel as claimed in claim 1, wherein said side walls have spaced holes therein to permit the free flow of air into and out of the kennel formed by said two side walls, said two end walls, and the top and the bottom surfaces.

3. The shipping kennel as claimed in claim 2, also including handles located on said top and bottom surfaces.

4. The shipping kennel as claimed in claim 3, also including a fastener member located on said top surface, and an engaging fastener member located on said bottom surface, said fastener member being engageable with the engaging member to lock the top surface to the bottom surface when the side walls are in a fully collapsed position.

5. The shipping kennel as claimed in claim 4, also including a handle mounted in the center of said top surface for transporting the top surface, the two side walls and the bottom surface.

* * * * *